United States Patent [19]

Ackerman et al.

[11] Patent Number: 6,063,296
[45] Date of Patent: May 16, 2000

[54] AGGLOMERATE REMOVAL AND DEWATERING APPARATUS

[75] Inventors: Kyle D. Ackerman, Dassel; David A. Hauch, Afton, both of Minn.

[73] Assignee: Carter Day International, Inc., Minneapolis, Minn.

[21] Appl. No.: 09/111,508

[22] Filed: Jul. 8, 1998

[51] Int. Cl.[7] .......................... B01D 37/00; B01D 33/72; B07B 13/16

[52] U.S. Cl. .......................... 210/767; 209/240; 209/255; 209/352; 210/137; 210/433.1; 425/197

[58] Field of Search .................................. 209/240, 241, 209/243, 247, 250, 255, 258, 352, 353, 497, 499, 244; 210/137, 433.1, 434, 456, 499, 767; 425/197, 198, 199

[56] References Cited

U.S. PATENT DOCUMENTS

| 2,446,293 | 8/1948 | Minyard | 210/434 |
| 3,485,364 | 12/1969 | Burrough | 209/247 |
| 3,572,505 | 3/1971 | Jongbloed | 209/240 |
| 4,085,040 | 4/1978 | Egan | 210/456 |

OTHER PUBLICATIONS

Six page brochure showing an agglomerate unit and a dewatering unit by Carter Day International, Undated.

*Primary Examiner*—Joseph W. Drodge
*Attorney, Agent, or Firm*—Craig M. Gregersen; Briggs and Morgan

[57] ABSTRACT

The present invention provide apparatus and method for removing agglomerates from a slurry comprising a transport fluid and particulate matter carried by the transport fluid. The present invention includes a fluid flow control unit and an agglomerate removal unit fluidly connected thereto. The fluid flow control unit provides for a reduction in the flow velocity entering the agglomerate removal unit by increasing the output cross section relative to the input cross section and by providing a dewatering door that can be opened to varying degrees to allow variable outflow of transport fluid from the fluid flow control unit. The agglomerate removal unit has at least a first screen over which the slurry flows as it exits the fluid control unit. The screen includes a plurality of apertures appropriately sized to allow the transport fluid and the particulate matter to flow therethrough but not the agglomerates. The screen is a planar grid disposed at an angle to the horizontal and has a plurality of spaced apart elongate rods to allow the passage through of the transport fluid and the particles, but not the agglomerates which are moved downwardly along the rods by the flow of the transport fluid to the lowermost end thereof into a discharge chute and from there into an appropriate waste disposal collector.

46 Claims, 6 Drawing Sheets

AGGLOMERATE REMOVAL AND DEWATERING APPARATUS

FIELD OF THE INVENTION

The present invention relates, in general, to apparatus useful in removing agglomerations of material from a slurry comprising a fluid and particulates and, in particular, to such an apparatus useful in removing agglomerations of the particulates from the slurry.

BACKGROUND OF THE PRESENT INVENTION

The manufacture of plastics typically involves extruding the raw, melted plastic material from an extruder and then forming the raw plastic into substantially spherical particles. The plastic particles are entrained in a cooling transport fluid, which is typically water, to form a slurry. The slurry then carries the particulates to other locations in the plastics manufacturing plant for further processing, including but not limited to: removal of undesirable materials, including but not limited to agglomerates; dewatering, that is, removal of some portion of the transport fluid from the slurry; and packaging for shipment to manufacturers of plastic products. Agglomerates, generally speaking, are clumps of particulates. In the plastics manufacturing industry, such agglomerates form as the hot plastic beads clump together within the transport fluid before having a sufficient time to cool. The hot outer surfaces of the plastic beads can in some circumstances melt or otherwise join together to form undesired clumps of raw plastic.

Figure 5:
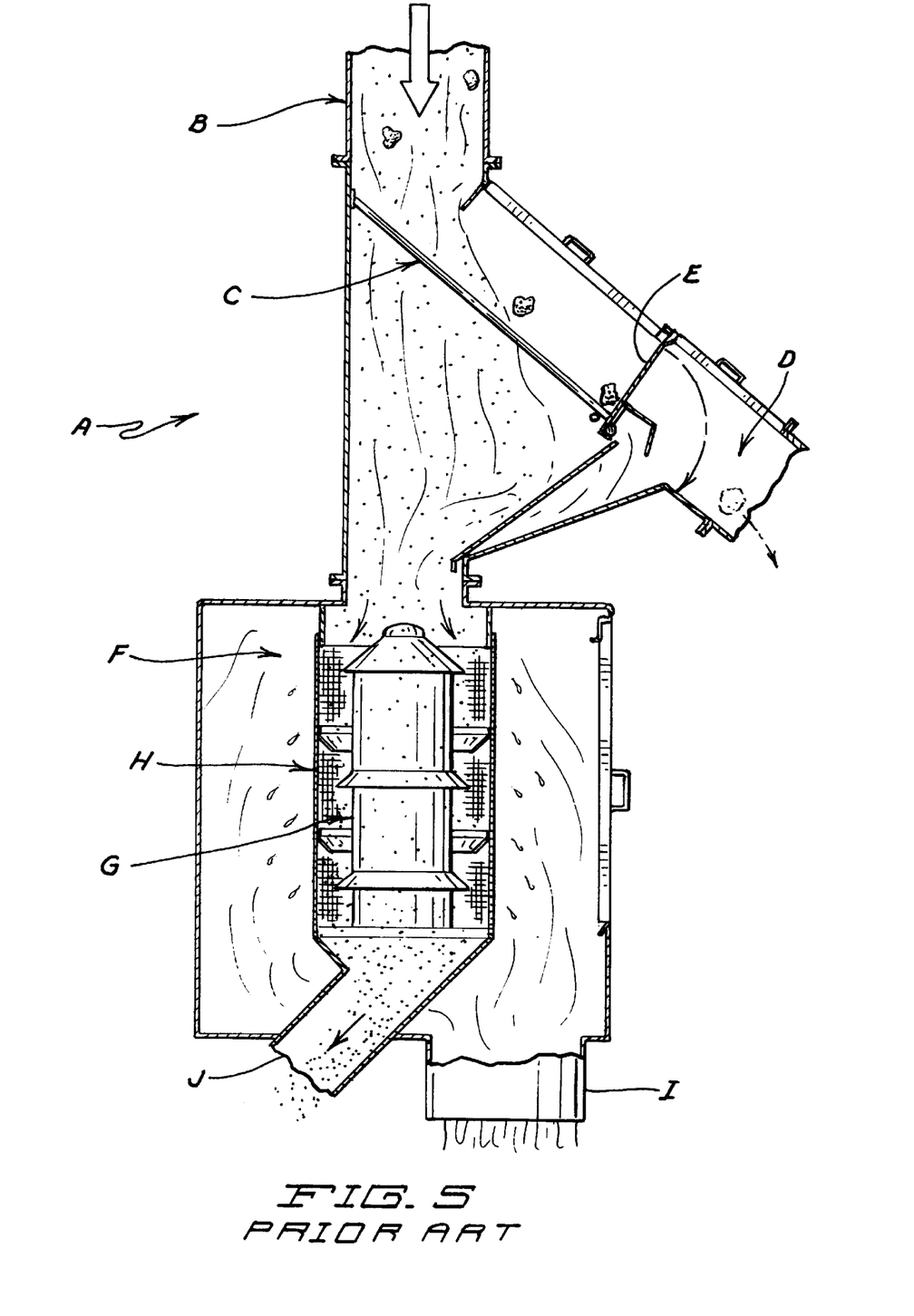
FIG. 5 is a view of a prior art apparatus.
Figure 6:
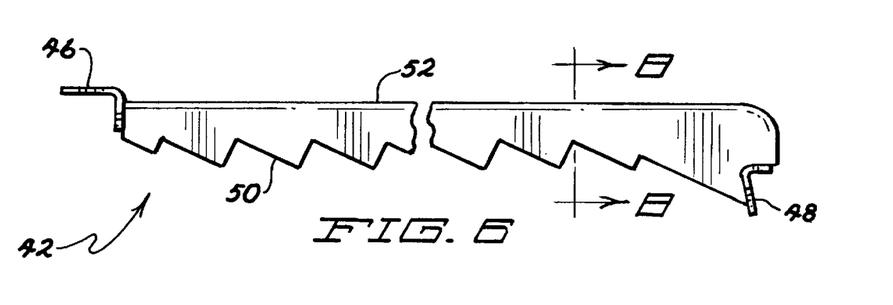
FIG. 6 is an end view of a screening grid in accord with the present intention.
Figure 7:
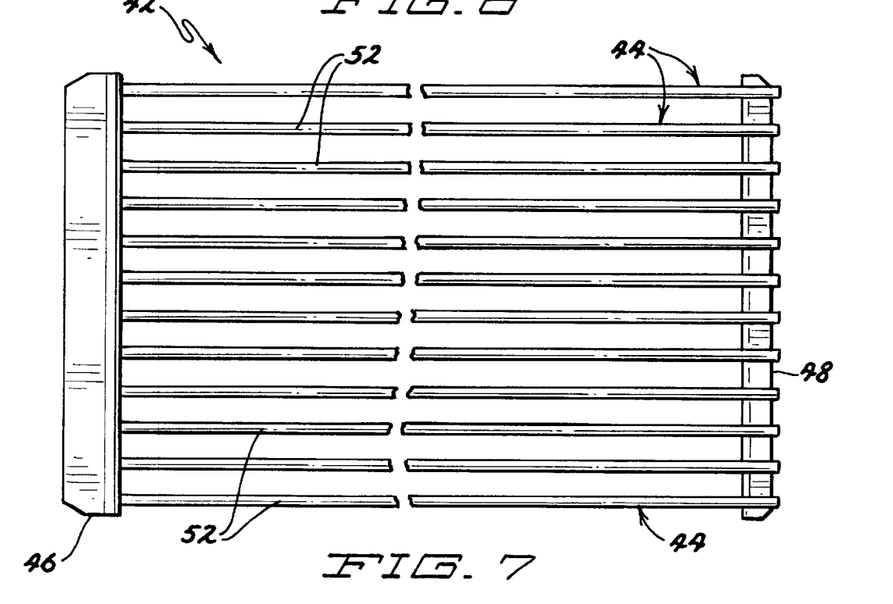
FIG. 7 is a top plan view of a screening grid in accord with the present invention.
Figure 8:
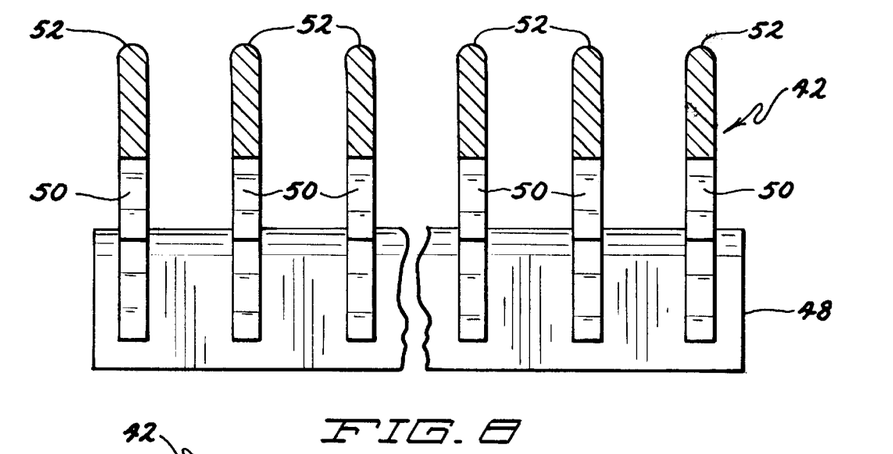
FIG. 8 is cross sectional view of the screening grid shown in FIG. 7 taken along viewing plane 8—8 of FIG. 6.

In the prior art devices used to remove agglomerates, one example of which is shown in FIG. 5, the slurry was brought into the apparatus A through a piping system that provided a flow in the apparatus A directly from an overhead pipe B. The slurry flow passed over a screen C containing holes or apertures sized to allow the desired plastic particles to pass through while not allowing agglomerations of the particulates to do so. Typically the velocity of the slurry over the screen C was the same as that of the slurry in the transport pipes to the screen. In many such prior art agglomerate removal operations the agglomerate removal unit is located at some extended transport distance from the extruder and are often found at an elevated location relative to the extruder, such as on an upper floor of the plastics operation facility. This extended distance between the extruder and the agglomerate removal unit is provided to allow the slurry the opportunity to cool. Thus, the slurry may be transported some distance through piping including multiple turns as well as to a higher elevation than the extruder that forms it.

In many if not most uses, such an aforementioned agglomerate removal unit screen C took the form of a grid comprising a plurality of spaced apart rods or ribs set at an angle. As the slurry flowed over the grid, the fluid and the plastic beads would pass through the screening apertures while the agglomerations would be trapped on the upper surface of the grid and washed off by the flow of the transport fluid into a discharge chute D and from there into a waste collector. Often the entrance to the chute D would be blocked by a pivotable door or gate E, against which the agglomerations would accumulate until a sufficient amount of material was accumulated to cause a triggering of a photoelectric or other sensor and the subsequent activation of a pneumatic cylinder to open the door or gate E, allowing the agglomerations to be moved into the chute D by the force of the flow of the slurry and gravity. The slurry less the agglomerates then travels onto a dewatering unit F for separation of the particulates from the transport fluid. The dewatering unit F included a central flanged tower G surrounded by a flanged screen H sized to allow fluid through but not particles. The screened slurry would thus pass into the unit F, the particles entrained in the transport fluid bounce between the flanged tower G and the screen, with the fluid flowing through the screen H and out through a transport fluid exit pipe I. The particles and some fluid will exit the apparatus A through a discharge pipe J and will be taken for further processing elsewhere. In many instances such processing will include drying within a dryer.

The prior art devices manifest several deficiencies. First, they ignored or failed to control the flow rate of the slurry prior to the agglomerate removal unit. In other words, they failed to provide an optimum process flow velocity to the agglomerate removal unit and thus failed to optimize the operation of the agglomerate removal unit. Flow rate variables such as gravity, pipe size, pump size, and particulate type can affect the flow rate and thus the performance of equipment operations downstream of where the slurry is formed. Such variables can cause the flow rate to vary widely, such as, by way of example only, from about 3 feet per second (37.5 centimeters per second) to over 15 feet per second (187.5 centimeters per second). Velocity variances as found in the prior art devices can have several problematic effects.

First, a low slurry flow rate, which can arise from using oversized piping, can magnify the effects of gravity on the continuity of the process flow. That is, where there is a low slurry flow velocity, the pressure drop associated with piping elbows or other piping components is minimized or negligible. Where a particular installation includes large vertical drops in the slurry piping, gravity can accelerate the flow faster than the slurry is being pumped, in turn leading to an uneven or non-continuous flow of slurry into the agglomerate removal unit.

Second, a low flow velocity can facilitate the separation of the particulates or transported materials from the transport fluid in certain circumstances. This separation can occur where the effects of the relative specific gravities of the transport fluid and the transported particulates overcomes those of the flow velocity. Stated otherwise, where the flow velocity gets too low, an additional effect of gravity is that the transported particulates can rise or sink relative to the molecules of the transport fluid. This effect can be avoided by maintaining a defined minimum flow velocity.

Third, a flow velocity that is too high can create problems of another kind. High flow velocities can lead to plugging and leakage problems at the agglomerate removal unit. In addition, a high flow velocity implies a high pumping capacity, which in some cases can be greater than that actually needed and thus implies economic inefficiencies in the plant operation.

Another deficiency of prior art apparatus is that they require all of the transport fluid to pass through the agglomerate removal screen or grid. This high fluid flow rate can cause the screening apertures to become plugged with particulates. In other words, the high volume flow rate can force the particulates to become wedged within the screening apertures.

A third deficiency is that prior art designs utilized a vertical fluid flow onto the angularly disposed agglomerate screen. As seen in FIG. 5, often the flow of the slurry over the screen C would be directly downwardly from the inlet pipe at high velocity. This design can create at least two separate problems. One of these problems is that the vertical slurry drop allowed gravity to accelerate the slurry to a high velocity. The high velocity in turn can cause the agglomerates to impact the screening grid with sufficient force to become wedged in the screening apertures. This problem is exacerbated where the transported particulates are warm plastic beads because once wedged in the screening apertures they will cool further and harden, thus becoming very difficult to remove. As other agglomerates impact the already wedged particles they may stick to each other. This process can continue until the screen is substantially or totally obstructed and the slurry can no longer pass through it.

A second problem with the prior art designs is that the angle of the impact between the fluid flow and the planar screen surface was conducive to screen plugging, particularly where the agglomerates were not elastic as when they comprised soft, warm plastic beads.

Yet another deficiency with prior art designs is that they typically have an inlet to the agglomerate removal unit that is a simple outlet of a pressurized transport pipe. As the slurry exits the transport pipe, it flares or expands in cross sectional area, leading to a turbulent flow profile. In turn, this flow profile made containment of the slurry flow within the desired zone or area difficult.

Another design deficiency in prior art agglomerate removal devices arose from their use of an agglomerate gate such as the gate E shown in FIG. 5. These gates retain the agglomerates removed from the slurry until a certain volume or weight of agglomerates has been accumulated. When the required amount of agglomerates has been reached, the gate will open and the agglomerates will be discharged out a discharge chute. Often gates will fail to seal properly when closing. This failure to seal can be caused by agglomerates being caught in the gate. An improperly sealed gate can leak transport fluid and any particulates that may have accumulated, leading to the loss of product and a potential employee hazard due to the leakage of potentially scalding transport fluid beyond the agglomerate removal chute.

In addition, where the particulate material is plastic, the agglomerates can themselves stick to each other and become a larger, cooling mass. Finally, the use of such gates requires expensive electrical and mechanical components to open and close the gate at the desired times.

A final disadvantage of the prior art designs is the danger they posed to a worker who was required to clean them. As previously noted, the prior art devices often became plugged. Cleaning had to take place during operation, meaning that the worker was exposed to the danger posed by splashing high temperature transport fluids. For example, where the transport fluid is water and the particulates comprise raw plastic beads, the temperature of the transport fluid can become high enough to scald a worker. Thus, scalding protective clothing is required. The prior art designs exacerbated the problem by allowing an uncontrolled splashing of the transport fluid.

It would be desirable to have a new and improved agglomerate and dewatering unit that was not subject to the foregoing disadvantages.

SUMMARY OF THE INVENTION

It is an object of the present invention to provide new and improved apparatus that is not subject to the foregoing disadvantages.

It is another object of the present invention to provide an agglomerate removal unit that is less subject to clogging of the agglomerate removal screen.

It is still another object of the present invention to provide an agglomerate removal unit that enables the selective control of the flow rate of the slurry over the agglomerate removal screen.

It is yet another object of the present invention to provide an apparatus that reduces the likelihood of worker injury when cleaning the screen.

It is still yet another object of the present invention to provide an apparatus that eliminates the need for an agglomerate removal gate.

It is an object of the present invention to provide an apparatus that allows the operator to selectively remove transport fluid from the slurry prior to the removal of agglomerates from the slurry.

It is still another object of the present invention to reduce the likelihood of screen plugging during agglomerate removal operations.

The foregoing objects of the present invention are provided by apparatus and method for removing agglomerates from a slurry comprising a transport fluid and particulate matter carried by the transport fluid. An apparatus in accord with the present invention includes a fluid flow control unit and an agglomerate removal unit fluidly connected thereto. The fluid flow control unit has a slurry inlet and a slurry outlet vertically disposed relative thereto. The fluid flow control unit has increasing cross-sectional area in the vertical or upright direction. The fluid flow control unit has a slurry inlet cross-sectional area and the slurry outlet has a slurry outlet cross-sectional area which is greater than the slurry inlet cross-sectional area.

In a preferred embodiment according to the present invention the fluid control unit has a dewatering door that can be opened to varying degrees to allow variable outflow of transport fluid from the fluid flow control unit. A dewatering door screen is disposed in the door opening, the screens having a plurality of apertures therein dimensioned to allow only the transport fluid to pass therethrough and not the particulates entrained in the transport fluid.

Disposed adjacent to and gravitationally downstream of the slurry outlet is the agglomerate removal unit. The agglomerate removal unit has at least a first screen over which the slurry flows as it exits the fluid control unit. The screen includes a plurality of apertures appropriately sized to allow the transport fluid and the particulate matter to flow therethrough but not the agglomerates. In a preferred embodiment the screen is a planar grid disposed at an angle to the horizontal and having a plurality of spaced apart elongate rods, wherein the spacing between the rods is less than the size of the agglomerates such that agglomerates are unable to pass through the spaces and are rather moved downwardly along the rods by the flow of the transport fluid to the lowermost end thereof into a discharge chute and from there into an appropriate waste disposal collector. Again in the preferred embodiment the rods further include a sawtooth configuration on the lower side thereof. The saw-tooth configuration aids in the minimization of the formation of fluid droplets along the lower edge of the rods by causing the fluid drops to travel downhill to a "point" on the sawtooth and collect so as to form drops of sufficient size that they fall off the rods.

Transport fluid and particulate matter entrained therein that flows through the screen falls downwardly onto a supplemental dewaterer similar to that found in prior art devices. The particulates are bounced laterally between a tower and a circumferentially extending screen, which causes the separation of the particulates from the transport fluid. The separated but still damp particles exit the present invention and are transported elsewhere for further processing while the separated transport fluid may be recycled within the production facility.

The foregoing objects of the invention will become apparent to those skilled in the art when the following detailed description of the invention is read in conjunction with the accompanying drawings and claims. Throughout the drawings, like numerals refer to similar or identical parts.

DETAILED DESCRIPTION OF THE INVENTION

Figure 1:
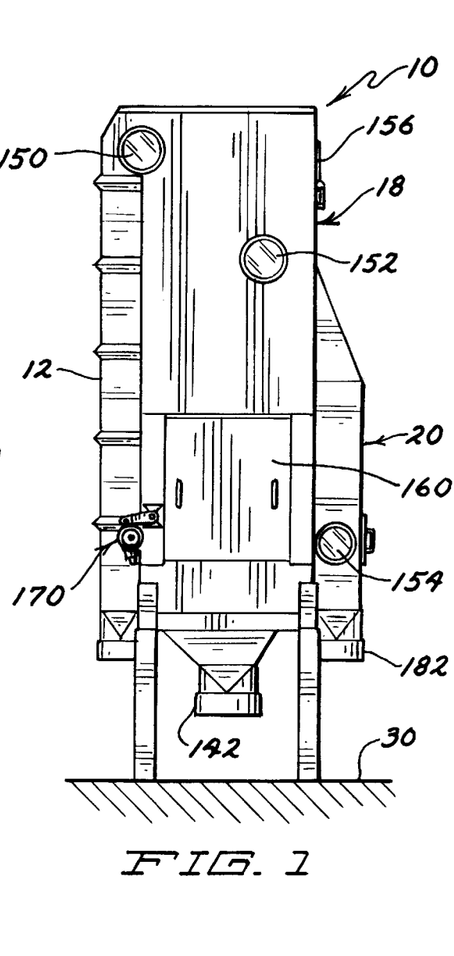
FIG. 1 is a front elevation view of an apparatus in accord with the present invention.
Figure 2:
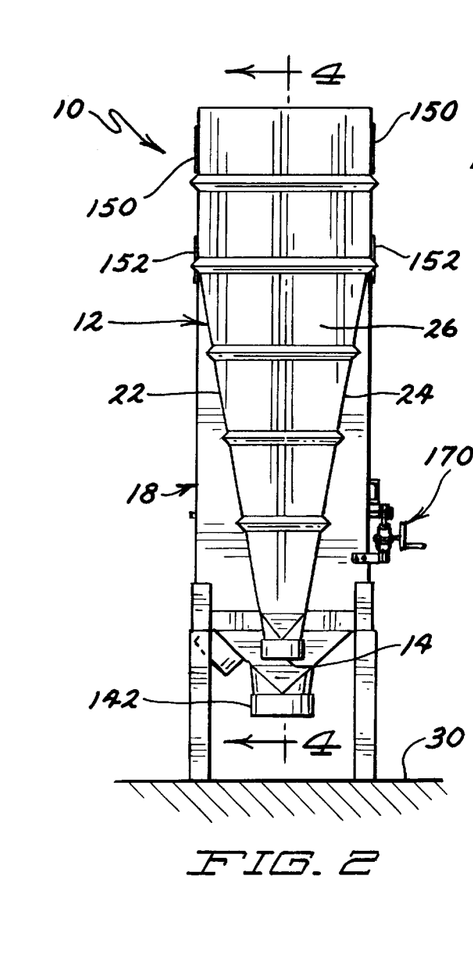
FIG. 2 is a side elevation view of an apparatus in accord with the present invention.
Figure 3:
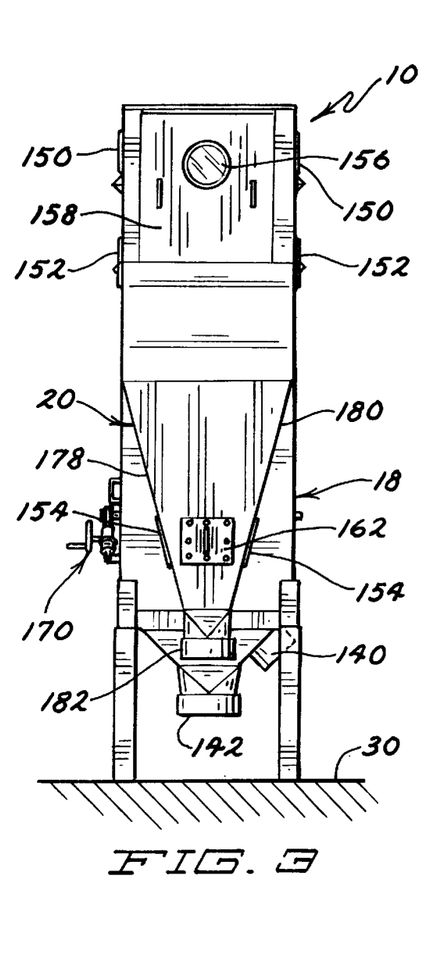
FIG. 3 is a side elevation view of an apparatus in accord with the present invention.

Referring now to FIGS. 1–3, an apparatus 10 in accord with the present invention will be described. Apparatus 10 includes a flow control unit 12 having a slurry inlet 14 and a slurry outlet 16 (best seen in FIG. 4). Apparatus 10 further includes an agglomerate removal unit 18 and an agglomerate discharge chute 20. It will be understood that a slurry enters apparatus 10, which may be broadly described as an agglomerate removal and dewatering unit, through the slurry inlet 14 and passes through the flow control unit 12 and out of the slurry outlet into the agglomerate removal unit 18.

The flow control unit includes a pair of end walls 22 and 24 and a pair of side walls 26 and 28. It will be observed that in the embodiment shown in the Figures that end walls 22 and 24 include first and second portions. The first, or lower, portions diverge from their lowermost portion in an upwardly direction. The second or upper portions are substantially parallel to each other, though if desired they could also diverge. Walls 22, 24, 26, and 28 cooperatively define a flow passage 29 through the flow control unit 12. It will be understood that a cross section taken through the first or lower portion of flow control unit 12 will increase in area as the altitude of the cross section above the surface 30 increases. While the present embodiment of the flow control unit 12 has a substantially rectangular cross section in a plane substantially parallel to the surface 30, it will be understood that the configuration of the cross section is not critical to the present invention, but is only one embodiment thereof. Other configurations and cross sections could also find use with the present invention, particularly those with an increasing cross section from the inlet to the outlet, since, as noted below, the increasing cross section aids in controlling the flow velocity of the slurry.

Figure 4:
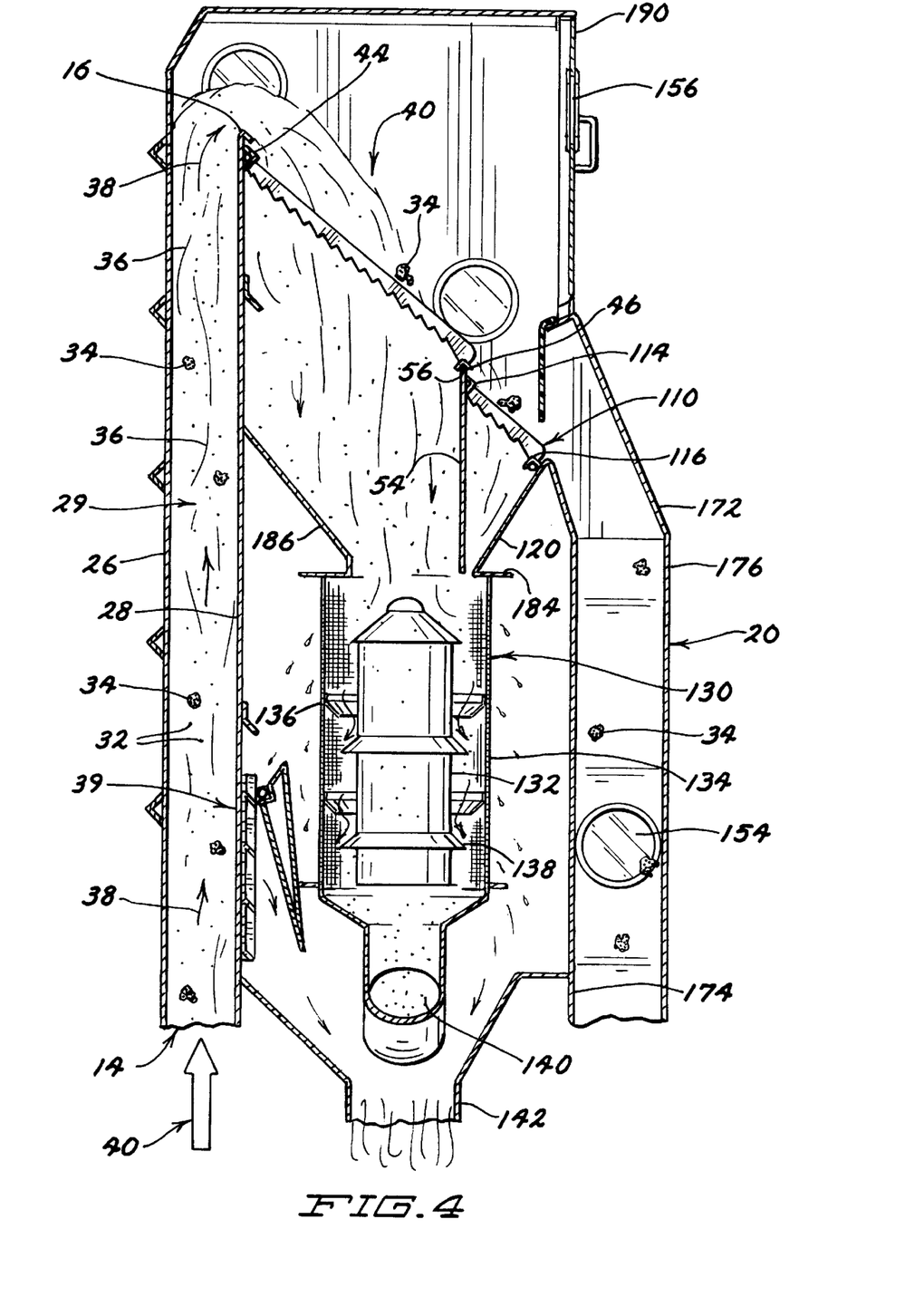
FIG. 4 is a front elevation, cross section view of an apparatus in accord with the present invention.

Referring to FIG. 4, it will be observed that the flow of slurry through the apparatus 10 is shown with the use of desired particulate matter 32, agglomerates of the particulate matter 34, and flow lines 36 indicating the flow of the transport fluid through the apparatus 10 in the direction shown by the arrows 38. Thus, the slurry enters the flow control unit 12 as indicated by the arrow 40 and flows upwardly. As the slurry flows upwardly, it spreads out through the flow passage 29, with the result that the flow velocity of the slurry decreases as it flows upwardly within the flow control unit flow passage 29. Thus as the slurry nears the slurry outlet 16, its upward velocity has been reduced compared to that of the velocity of the slurry as it entered unit 12 through inlet 14. Precise control over the flow velocity is achieved with a dewatering door unit 39, to be described in additional detail below.

Referring to FIGS. 4 and 6–8, the structure of apparatus 10 and an invention in accord with the present invention will be described further. Thus, it will be observed that as the slurry exits the flow control unit 12, it encounters a screening apparatus 40 within agglomerate removal and dewatering unit 18. Screening apparatus 40 comprises at least a first screen 42. Screen 42 is shown in the present embodiment in a top plan view in FIG. 7. In the present embodiment, the screen 42 comprises a plurality of substantially uniformly spaced apart elongate rods 44 mounted at opposing ends thereof to mounting brackets 46 and 48. In the present embodiment, mounting brackets 46 and 48 have been configured to have a substantially L-shaped configuration. The rods 44 are shown in a side elevation view and include a "saw-toothed" bottom surface 50 and a rounded upper surface 52. The configuration of the bottom surface 50 aids in minimizing the formation of water droplets.

Referring to FIG. 2, it will be observed that screen 42 is supported at one end, the end with the bracket 46, near the top of side wall 28 and at the other end by a screen support wall 54. Wall 54 has a top edge 56 upon which mounting bracket 48 rests such that the wall 54 engages the inside of the L-shaped bracket. With this configuration, the bracket 46 can rest against the wall 28 and the screen 42 can be easily lifted out for cleaning and repairs as necessary and readily replaced. The present apparatus thus provides for readily accessible and easily removed screens, thus facilitating the cleaning process when the screens become plugged.

Referring now particularly to FIGS. 2 and 9–12, the dewatering door unit 39 will be described. Unit 39 is provided to enable the operator to further control the flow rate by enabling some of the transport fluid to flow out of the unit 12 and into the unit 18 without flowing over the screen 42. Unit 39 includes a frame 60 that is mounted in known manner such as by welding or bolting to the wall 28 such that is covers an opening (not shown for purposes of clarity of illustration) in the wall 28. Frame 60 includes a pair of upright L-shaped members 62, 64 and a plurality of laterally extending members 66. The members 66 may, as shown, include an upright member 68 and an outwardly and downwardly extending member 70. The members 70 and the inwardly extending members 72 of upright members 62 and 64 preferably extend inwardly the same distance. A screen 74 is trapped between the frame 60 and the wall 28. Screen 74 has a plurality of apertures which are of sufficient size to allow the transport fluid to flow therethrough but that are too small to permit passage of the particulates in the slurry.

Figure 9:
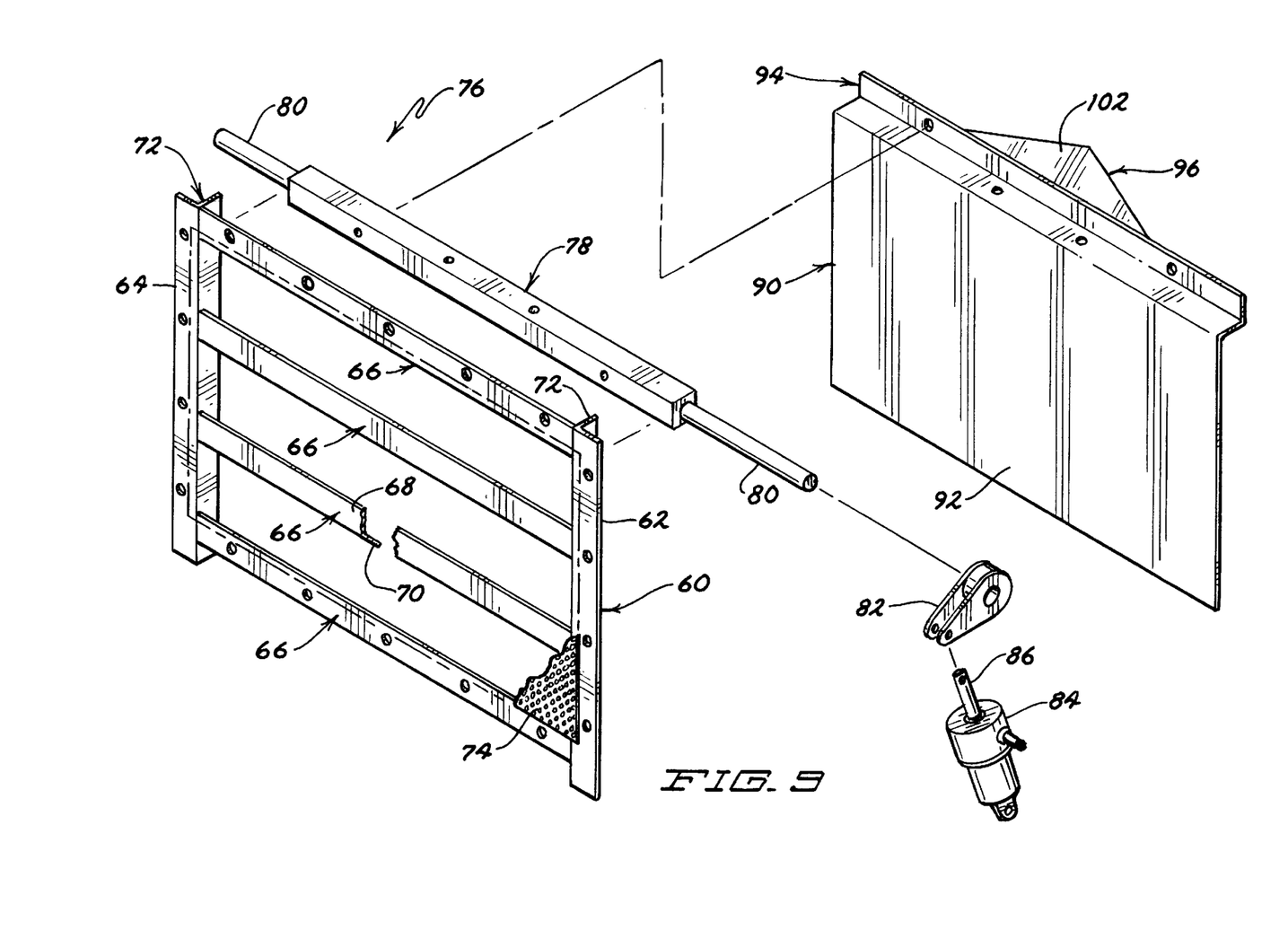
FIG. 9 is an exploded perspective view of a transport fluid control door and frame in accord with the present invention.
Figure 10:
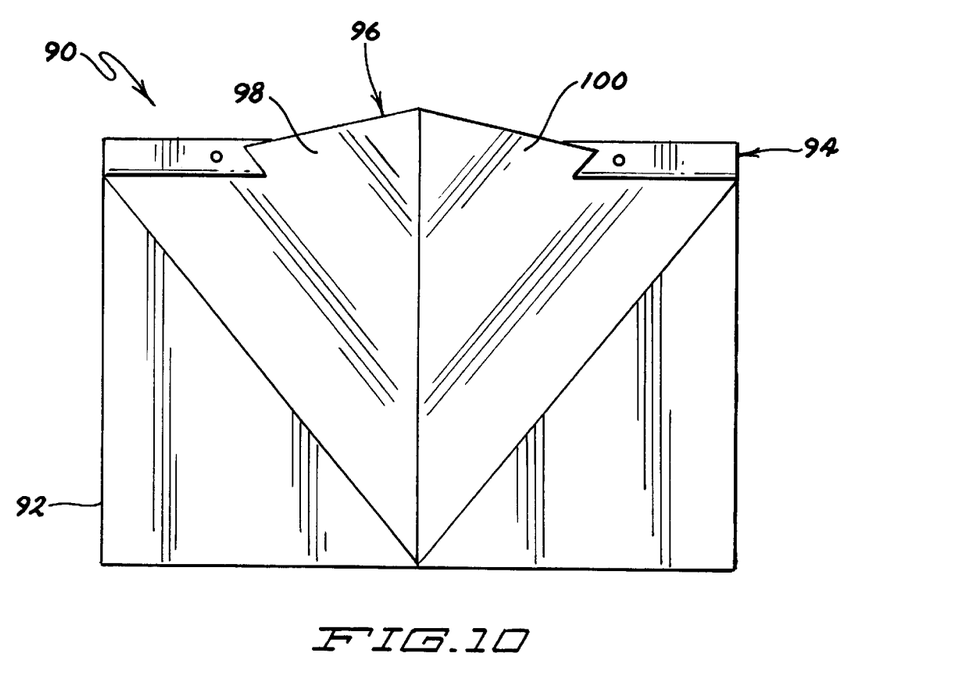
FIG. 10 is a front elevation view of a transport fluid flow control door in accord with the present invention.
Figure 11:
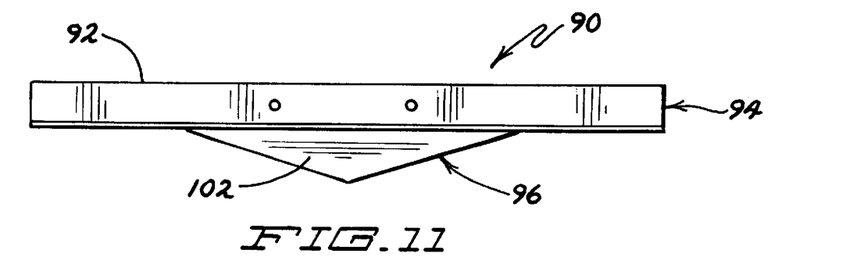
FIG. 11 is a top plan view of a transport fluid flow control door in accord with the present invention.
Figure 12:
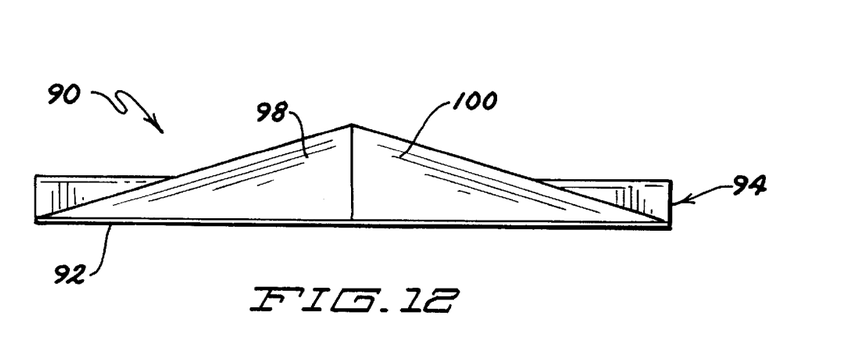
FIG. 12 is a bottom plan view of a transport fluid flow control door in accord with the present invention.

A pivotable rod 76 is mounted to the unit 18. Rod 76 includes a mounting rod 78. It will be observed that rod 78 has a substantially rectangular configuration and that rod 76 includes a pair of cylindrical rods 80 that extend outwardly from the ends of the rod 78 in the configuration shown. The rods 78 are mounted in known manner to the unit 18 so as to be freely rotatable with respect thereto. Attached to one end of the pivoting rod 76 is a bracket 82. Bracket 82 is in turn connected to an actuator 84, which includes an extendible piston 86, which is attatched to the bracket 82. Actuation of the actuator 84 so as to cause the piston 86 to extend or retract will thus cause the rotation of the rod 76.

A door 90 is attached to the pivotable rod 76 in any known manner such as bolting. It will be understood that while a particular configuration of pivotable rod 76 has been described, any other configuration that will facilitate the controlled pivoting of door 90 can be used in accord with the present invention.

Door 90 will now be described with particular reference to FIGS. 9–12. Door 90 includes a sealing member 92. Sealing member 90 has a substantially planar structure and engages the members 70 and 72 such that when the door 90 is closed the transport fluid is unable to flow through the opening in the wall 28 from the unit 12 into the unit 18. Door 90 further includes an L-shaped member 94 that is attached to sealing member 92 and may be integral therewith as shown in the Figures. Door 90 further includes deflector member 96, which includes a pair of substantially mirror shaped members 98, 100 attached to each other and to the member 90 and an end plate 102. Each member 98, 100 and 102 have a substantially triangular configuration. Members 98 and 100 are attached to each other and to the end plate 102 so as to form a partially pyramidal configuration.

Door 90 may be opened and closed or set to a desired opening stage as desired. In this manner, the flow of the slurry over the screen 42 may be more precisely controlled. That is, depending on the flow rate, the door 90 can be opened to a desired level and allow a predetermined volume of transport fluid to flow through the screen 74 and out of the flow control unit 12 without passing over the screen 42. In this manner, then, the flow rate of fluid passing over the screen can be reduced to a desired level, which will provide a washing action over the screen 42 and the screen 110 so as to wash agglomerates off and into the discharge chute 20 yet no be so great as to cause clogging of the screen or the other problems mentioned in regard to prior art apparatus.

Referring once again to FIG. 4, it will be observed that the screening apparatus 40 may include a secondary agglomerate screen 110. Screen 110 will be constructed substantially similar to screen 42 except that it will not have the same length since it fits within a smaller area. Screen 110 is provided to allow another opportunity for agglomerates to be screened out and an opportunity to recapture any particulate matter that may have been washed over the screen 42 instead of flowing through the apertures therein. Thus, screen 110 may include a plurality of rods 112 connected to a pair of mounting brackets 114, 116, which are similar in structure and design to mounting brackets 44 and 46. Screen 110 is thus similarly designed to be easily removed for cleaning and any needed repair. Screen 110 is supported at bracket 116 by a screen support rod 118 which is fixedly attached to a wall 120 of unit 18 and by the bracket 114 resting against the wall 54. Thus, in operation, transport fluid will wash agglomerates and some particulate matter off screen 42 onto screen 110. The continued downward slope of the screen 110 will enable the transport fluid to continue to wash the agglomerates off the end of the screen 110 into the discharge chute 20. The transport fluid and the particulate matter will flow through the screen 10 for further processing to be described hereafter.

Apparatus 10 further includes a dewatering unit 130. Unit 130 is similar to the prior art dewatering unit F described previously. Dewatering unit 130 includes a central tower 132 having a substantially cylindrical configuration. The central tower 132 is surrounded by a substantially cylindrical screen 134 having a plurality of screening apertures sized to allow flow of the transport fluid through the screen but not the particulates entrained in the fluid. The screen 134 includes a plurality of vertically spaced apart flanges 136 extending inwardly toward the tower 132. The tower 132 includes a plurality of outwardly extending flanges 138. In operation, the fluid flow will enter the dewatering unit 130 from the screens 42 and 110. The particles will bounce back and forth between the flanges 136 and 138 and the tower 130 and screen 134, causing the transport fluid to separate from the particles. The fluid will largely flow through the screen 134 while the particles will drop downwardly into a particle discharge chute 140. The fluid meanwhile, will exit the apparatus I 0 through a fluid discharge pipe 142. As with the prior art apparatus, once the particles exit the apparatus 10 they will be further processed, which may include further drying.

Referring now to FIGS. 1–3, other features of the present invention will now be described. Agglomerate removal and dewatering unit 10 will desirably include a plurality of observation ports 150, 152, 154, and 156. Ports 150 and 156 will enable the operator to observe the flow of the slurry from the slurry outlet of the fluid flow control unit 12 into the agglomerate removal unit 18. Ports 152 and 156 will enable the operator to view both the flow of the slurry from the slurry outlet of the fluid flow control unit 12 into the agglomerate removal unit 18 as well as the flow over the screens 42 and 110. Port 154 will allow the operator to observe the flow of the agglomerates into and through the discharge chute 20 and to thus determine whether there is any plugging that is occurring. The present invention may also include a plurality of maintenance doors 158, 160, and 162 that are openable to provide access to the interior of the apparatus 10 for maintenance. In particular, door 158 will allow the operator to access the screens 42 and 110. Access door 160 will allow the operator to access the dewatering door unit 39 and the dewatering unit 130. Access door 162 will allow the operator to access the discharge chute 20 to remove any plugs that may have accumulated therein.

Finally, it will be observed that the apparatus 10 may include a hand crank 170 which can be connected to the dewatering door unit 39 in any known manner, thereby allowing the operator to manually adjust the position of the door 90. This will allow the operator to manually control the flow rate of the fluid entering unit 18 from flow control unit 12 through the control of the amount of transport fluid removed from the slurry through the door 90. The present invention 10 provides numerous advantages over the prior art and eliminates several of the deficiencies found therein. First, the present invention 10 includes a vertical inlet wherein slurry flow is directed upwardly. The increasing cross section in the direction of slurry flow within the fluid flow control unit provides a controlled reduction in the velocity of the slurry. The geometry afforded by the fluid flow control inlet 12 coupled with the deceleration of slurry due to gravitational forces creates a back pressure that eliminates the undesirable effects that gravity provided in the prior art designs. The present apparatus also provides a gradual increase in the cross sectional area and a sufficient height such that the likelihood of turbulence being created by the transition into the larger cross sectional flow passage provided by the flow control unit 12 is substantially reduced. This enables the slurry to flow at a controlled velocity through the slurry outlet 16 and over the top edge of the wall 28 onto the screen 42 rather than dropping at high velocity onto the screen C as is shown in the prior art design of FIG. 5. The result of all of these changes is that the slurry is provided to the screen 42 with a smooth, low fluid flow velocity, which in turn helps reduce the likelihood of screen clogging or plugging.

Another advantage of the present invention is that provided by the dewatering door unit 39. The ability to open and control door 90 enables the operator to selectively control the amount of fluid flowing over the screens 42 and 110. It will be understood that the screen 74 can have its screen apertures sized to allow all of the transport fluid to flow therethrough if desire, thus enabling the operator to precisely control the amount of "pre-dewatering" performed. The use of the door 90 to control the flow rate through the unit 39 enables the operator to control the horizontal flow of fluid through the screen relative to the vertical flow upwardly past the screen 74, which in turn helps prevent the particulates from plugging the apertures of screen 74, as well as those of the screens 42 and 110.

Another feature of the unit 39 is that the screen 74 can be monitored by watching the flow over the top edge of the wall 28 into the agglomerate removal unit 18. By observing the flow through the port 150, the operator can determine whether the screen 74 is becoming plugged or obscured by particulates. That is, if the flow through the screen 74 becomes essentially nil the observer will be able to see a change in the flow pattern through the port 150. As the screen 74 becomes obscured less fluid flows through it and thus more fluid must flow over the top of the wall 28, leading to a more turbulent flow. If such an observation is made, the operator can close door 90 temporarily, thereby allowing all of the fluid to flow past the screen 74 and wash any particulates away, assuming they aren't wedged in the screen apertures.

Another advantage of the present invention is that the present invention eliminates the need for the discharge gate E shown in FIG. 5. This provides for an immediate discharge of the agglomerates rather than a holding them, thereby eliminating the build up or clumping together of the agglomerates in the discharge chute into bigger clumps.

Yet still another advantage of the present invention is that the fluid flow can be precisely controlled within a range of about 1 foot per second to about 3 feet per second from an initial input velocity that approaches 15–16 feet per second and can vary over a range of about 8 to about 20 feet per second (thus providing a reduction in flow velocity wherein the ratio of the input or first velocity to output or second velocity is within the range of about 20:1 to about 8:3). This high flow rate plus the steep angle that many prior art agglomerate screens were disposed at, some as steep as 45–50°, tended to create plugging or wedging of agglomerates in the agglomerate screen. The present invention, by reducing the flow rate with the vertical inlet and increasing cross sectional flow area provided by flow control unit 12 and by providing a pre-dewatering flow outlet with the dewatering unit door 39, enables the fluid flow—screen approach angle to be a gentle angle of about 20° to about 30°, even though the screen 42 may be disposed at angles of about 40° to about 50°. The low flow velocity and the low angle of the screen enable the agglomerates to be gently washed along the top of the screen 42 and into the discharge chute 20 rather than becoming wedged between the screen rods as in prior art devices.

Finally, the present invention reduces the likelihood of any of the screens becoming plugged, which in turn reduces the likelihood for needing to clean them during operation. As noted previously, the transport fluid is often at temperatures high enough to scald a person. The present invention reduces the likelihood of the creation of turbulent flow and thus the likelihood of splashing of hot fluid.

Referring once again to FIGS. 1–4, the overall structure of the present invention will be described in additional detail. As shown in the drawings, the present apparatus may comprise a unitary structure formed of the appropriately configured and joined structural members. It will be recalled that the apparatus 10 includes flow control unit 12, agglomerate removal unit 18, and the agglomerate discharge chute 20. The flow control unit includes a pair of end walls 22 and 24 and a pair of side walls 26 and 28. As noted previously, wall 28 is a common wall between units 12 and 18. As shown the discharge chute comprises a discharge chute hood 172 and a substantially four walled structure including walls chute side walls 174 and 176 and chute end walls 178 and 180. As seen in FIG. 3, chute end walls 178 and 180 converge from the chute hood 172 downwardly to the chute discharge exit 182. Wall 174 is a common wall between the agglomerate removal unit 18 and the chute discharge 20.

Dewatering unit 130 includes a disk like flange 1184 attached to the stop of screen 134. Flange 184 supports a support member 186 that is supported by wall 28; a support member 120 that is attached to chute side wall 174 and which supports one end of the scree 112. The other end of the screen 110 is supported, as noted by wall 54. Apparatus 10 further includes a roof 190, which extends over and encloses the entire apparatus. Construction of apparatus 10 to include a substantially unitary structure as described eliminates the need to provide seals between the various component parts, unlike what is found in other prior art structures, thus making manufacture and maintenance simpler than in the prior art structures. In addition, the present invention provides a structural rigidity not found in the prior art apparatus.

The present invention having thus been described, other modifications, alterations, or substitutions may now suggest themselves to those skilled in the art, all of which are within the spirit and scope of the present invention. It is therefore intended that the present invention be limited only by the scope of the attached claims below.

What is claimed is:

1. Apparatus for removing agglomerates from a slurry comprising a transport fluid, a desired particulate matter, and undesirable agglomerates of the particulate material, said apparatus comprising:

a flow control unit including a slurry inlet and a slurry outlet disposed substantially vertically above said slurry inlet, said flow control unit having an increasing cross sectional area in the vertical direction for providing a flow passage for the flow of the slurry from said slurry inlet to said slurry outlet, wherein the rate of increase of cross sectional area from said slurry inlet to said slurry outlet is substantially uniform for reducing turbulence due to the change in the cross section from the slurry inlet to the slurry outlet and wherein the velocity of the slurry in a horizontal cross section through said flow passage is substantially uniform across said cross section;

an agglomerate removal unit, said agglomerate removal unit receiving the slurry from said slurry outlet and including an agglomerate removal screen unit through which the slurry is directed for separation of the agglomerates from the slurry;

wherein the slurry enters said flow control unit through said slurry inlet having a first velocity and exits said flow control unit through said slurry outlet having a second velocity, wherein said first velocity is more than said second velocity.

2. The apparatus of claim 1 wherein said second velocity is in the range of about 1 foot per second to about three feet per second.

3. The apparatus of claim 1 wherein said agglomerate removal screen unit comprises at least a first screen, said first screen being angularly disposed relative to the vertical, said first screen having screening apertures dimensioned such that the transport fluid and the particulate matter can flow therethrough and said agglomerates cannot;

wherein the slurry flows from said slurry outlet over said first screen, said first screen separating the agglomerates from the slurry.

4. The apparatus of claim 3 wherein said agglomerate removal screen unit includes a second screen, said second screen being angularly disposed relative to the vertical, said second screen having screening apertures dimensioned such that the transport fluid and the particulate matter can flow therethrough and said agglomerates cannot;

wherein the slurry flows from said slurry outlet over said second screen, said second screen separating the agglomerates from the slurry.

5. The apparatus of claim 4 wherein said second velocity is in the range of about 1 foot per second to about three feet per second.

6. The apparatus of claim 5 wherein said flow control unit includes at least one vertically oriented wall disposed between said flow control unit and said agglomerate removal unit, said wall including an opening and a transport fluid bypass unit, said bypass unit including a bypass unit door hingeably attached to said wall and movable between open and closed positions to open and close wall opening, said bypass door unit further including a bypass unit screen having a plurality of apertures selected to be smaller than the size of the particles in the slurry;

wherein said opening said bypass unit door allows transport fluid to flow therethrough to reduce the volume of transport fluid passing through said slurry outlet and therefore enabling the operator to control the flow rate of the slurry through said slurry outlet.

7. The apparatus of claim 3 wherein said flow control unit includes at least one vertically oriented wall disposed between said flow control unit and said agglomerate removal unit, said wall including an opening and a transport fluid bypass unit, said bypass unit including a bypass unit door hingeably attached to said wall and movable between open and closed positions to open and close wall opening, said bypass door unit further including a bypass unit screen having a plurality of apertures selected to be smaller than the size of the particles in the slurry;

wherein said opening said bypass unit door allows transport fluid to flow therethrough to reduce the volume of transport fluid passing through said slurry outlet and therefore enabling the operator to control the flow rate of the slurry through said slurry outlet.

8. The apparatus of claim 1 wherein said flow control unit includes at least one vertically oriented wall disposed between said flow control unit and said agglomerate removal unit, said wall including an opening and a transport fluid bypass unit, said bypass unit including a bypass unit door hingeably attached to said wall and movable between open and closed positions to open and close wall opening, said bypass door unit further including a bypass unit screen having a plurality of apertures selected to be smaller than the size of the particles in the slurry;

wherein said opening said bypass unit door allows transport fluid to flow therethrough to reduce the volume of transport fluid passing through said slurry outlet and therefore enabling the operator to control the flow rate of the slurry through said slurry outlet.

9. The apparatus of claim 1 wherein the ratio of said first velocity to said second velocity is within the range of about 20:1 to about 8:3.

10. Apparatus for removing agglomerates from a slurry comprising a transport fluid, a desired particulate matter, and undesirable agglomerates of the particulate material and for providing control of the flow rate of the slurry through said apparatus, said apparatus comprising:

a flow control unit including a slurry inlet and a slurry outlet, said flow control unit providing a flow passage for the flow of the slurry from said slurry inlet to said slurry outlet;

an agglomerate removal unit, said agglomerate removal unit receiving the slurry from said slurry outlet and including an agglomerate removal screen unit through which the slurry is directed for separation of the agglomerates from the slurry; and at least one vertically oriented wall disposed between said flow control unit and said agglomerate removal unit, said wall including an opening and a transport fluid bypass unit, said bypass unit including a bypass unit door hingeably attached to said wall and movable between open and closed positions to open and close said wall opening, said bypass door unit further including a bypass unit screen having a plurality of apertures selected to be smaller than the size of the particles in the slurry;

wherein opening of said bypass unit door allows transport fluid to flow therethrough to reduce the volume of transport fluid passing through said slurry outlet and therefore enabling the operator to control the flow rate of the slurry through said slurry outlet;

wherein the slurry enters said flow control unit through said slurry inlet having a first velocity and exits said flow control unit through said slurry outlet having a second velocity, wherein said first velocity is less than said second velocity.

11. The apparatus of claim 10 wherein said second velocity is in the range of about 1 foot per second to about three feet per second.

12. The apparatus of claim 10 wherein said agglomerate removal screen unit comprises at least a first screen, said first screen being angularly disposed relative to the vertical, said first screen having screening apertures dimensioned such that the transport fluid and the particulate matter can flow therethrough and said agglomerates cannot;

wherein the slurry flows from said slurry outlet over said first screen, said first screen separating the agglomerates from the slurry.

13. The apparatus of claim 12 wherein said agglomerate removal screen unit includes a second screen, said second screen being angularly disposed relative to the vertical, said second screen having screening apertures dimensioned such that the transport fluid and the particulate matter can flow therethrough and said agglomerates cannot;

wherein the slurry flows from said slurry outlet over said second screen, said second screen separating the agglomerates from the slurry.

14. The apparatus of claim 13 wherein said second velocity is in the range of about 1 foot per second to about three feet per second.

15. The apparatus of claim 14 wherein said first velocity is in the range of about 8 to about 20 feet per second.

16. The apparatus of claim 10 wherein the ratio of said first velocity to said second velocity is within the range of about 20:1 to about 8:3.

17. A method for removing agglomerates from a slurry comprising a transport fluid, particulates, and agglomerates formed from the particulates, wherein the slurry has a first velocity, said method comprising:

passing the slurry through a flow control unit having a cross section and having a slurry inlet and a slurry outlet, wherein the slurry inlet has an inlet cross section and the slurry outlet has an outlet cross section with the outlet cross section being larger than the inlet cross section, wherein:

the flow control unit cross section increases in size from the slurry inlet to the slurry outlet and said increasing flow control unit cross section reduces the flow velocity of the transport fluid; and the rate of increase of cross section from the slurry inlet to the slurry outlet being substantially uniform for reducing turbulence due to the change in the cross section from the slurry inlet to the slurry outlet and wherein the velocity of the slurry in a horizontal cross section through the flow passage is substantially uniform across the cross section;

providing an agglomerate removal screen, said screen including a plurality of screening apertures, said screen apertures being sized to allow the passage of transport fluid and particulates but not agglomerates; and passing the slurry over the agglomerate removal screen to separate the agglomerates from the transport fluid and particulates.

18. The method of claim 17 and further including:

removing a predetermined amount of transport fluid from the slurry while the slurry is flowing through the flow control unit.

19. The method of claim 18 and further including:

providing a transport fluid bypass unit in said flow control unit disposed downstream of said slurry inlet and upstream of said slurry outlet, said unit including a bypass outlet from said flow control unit, a screen having a plurality of apertures sized to allow transport fluid to pass through but not particulates, and a door selectively movable between open and closed positions to allow the operator to selectively control the flow rate and the volume of transport fluid released from said flow control unit through said bypass outlet.

20. The method of claim 19 wherein said second velocity is in the range of about 1 foot per second to about three feet per second.

21. The method of claim 20 wherein said first velocity is in the range of about 8 to about 20 feet per second.

22. The method of claim 21 wherein the ratio of said first velocity to said second velocity is within the range of about 20:1 to about 8:3.

23. The method of claim 17 wherein said second velocity is in the range of about 1 foot per second to about three feet per second.

24. The method of claim 17 wherein said first velocity is in the range of about 8 to about 20 feet per second.

25. The method of claim 24 wherein the ratio of said first velocity to said second velocity is within the range of about 20:1 to about 8:3.

26. Apparatus for removing agglomerates from a slurry comprising a transport fluid, a desired particulate matter, and undesirable agglomerates of the particulate material and for providing control of the flow rate of the slurry through said apparatus, said apparatus comprising:

a flow control unit including a slurry inlet and a slurry outlet, said flow control unit providing a flow passage for the flow of the slurry from said slurry inlet to said slurry outlet;

an agglomerate removal unit, said agglomerate removal unit receiving the slurry from said slurry outlet and including an agglomerate removal screen unit through which the slurry is directed for separation of the agglomerates from the slurry; and at least one vertically oriented wall disposed between said flow control unit and said agglomerate removal unit, said wall including an opening and a transport fluid bypass unit, said bypass unit including a bypass unit door hingeably attached to said wall and movable between open and closed positions to open and close said wall opening, said bypass door unit further including a bypass unit screen having a plurality of apertures selected to be smaller than the size of the particles in the slurry;

wherein opening of said bypass unit door allows transport fluid to flow therethrough to reduce the volume of transport fluid passing through said slurry outlet and therefore enabling the operator to control the flow rate of the slurry through said slurry outlet.

27. The apparatus of claim 26 wherein said agglomerate removal screen unit comprises at least a first screen, said first screen being angularly disposed relative to the vertical, said first screen having screening apertures dimensioned such that the transport fluid and the particulate matter can flow therethrough and said agglomerates cannot;

wherein the slurry flows from said slurry outlet over said first screen, said first screen separating the agglomerates from the slurry.

28. The apparatus of claim 27 wherein said agglomerate removal screen unit includes a second screen, said second screen being angularly disposed relative to the vertical, said second screen having screening apertures dimensioned such that the transport fluid and the particulate matter can flow therethrough and said agglomerates cannot;

wherein the slurry flows from said slurry outlet over said second screen, said second screen separating the agglomerates from the slurry.

29. The apparatus of claim 26 wherein the slurry enters said flow control unit through said slurry inlet having a first velocity and exits said flow control unit through said slurry outlet having a second velocity, wherein said first velocity is less than said second velocity.

30. The apparatus of claim 29 wherein said second velocity is in the range of about 1 foot per second to about three feet per second.

31. The apparatus of claim 30 wherein said first velocity is in the range of about 8 to about 20 feet per second.

32. The apparatus of claim 29 wherein the ratio of said first velocity to said second velocity is within the range of about 20:1 to about 8:3.

33. A method for removing agglomerates from a slurry comprising a transport fluid, particulates, and agglomerates formed from the particulates, wherein the slurry has a first velocity, said method comprising:

removing a predetermined amount of transport fluid from the slurry while the slurry is flowing through the flow control unit by providing a transport fluid bypass unit in said flow control inlet unit disposed downstream of said slurry inlet and upstream of said slurry outlet, said unit including a bypass outlet from said flow control unit, a screen having a plurality of apertures sized to allow transport fluid to pass through but not particulates, and a door selectively movable between open and closed positions to allow the operator to selectively control the flow rate and the volume of transport fluid released from said flow control unit through said bypass outlet;

providing an agglomerate removal screen, said screen including a plurality of screening apertures, said screen apertures being sized to allow the passage of transport fluid and particulates but not agglomerates; and passing the slurry over the agglomerate removal screen to separate the agglomerates from the transport fluid and particulates.

34. The method of claim 33 wherein said second velocity is in the range of about 1 foot per second to about three feet per second.

35. The method of claim 34 wherein said first velocity is in the range of about 8 to about 20 feet per second.

36. The method of claim 34 wherein said second velocity is in the range of about 1 foot per second to about three feet per second.

37. The method of claim 33 wherein the ratio of said first velocity to said second velocity is within the range of about 20:1 to about 8:3.

38. The method of claim 33 and further including:

reducing the velocity of the slurry from the first velocity to a second velocity by passing the slurry through a flow control inlet unit having a slurry inlet and a slurry outlet, wherein said slurry inlet has an inlet cross section and the slurry outlet has an outlet cross section, said outlet cross section being larger than said inlet cross section, wherein said increasing cross section reduces the flow velocity of the transport fluid.

39. The method of claim 38 wherein said second velocity is in the range of about 1 foot per second to about three feet per second.

40. The method of claim 39 wherein said first velocity is in the range of about 8 to about 20 feet per second.

41. The method of claim 38 wherein the ratio of said first velocity to said second velocity is within the range of about 20:1 to about 8:3.

42. Apparatus for removing agglomerates from a slurry comprising a transport fluid, a desired particulate matter, and undesirable agglomerates of the particulate material, said apparatus comprising:

a flow control unit including a slurry inlet and a slurry outlet disposed substantially vertically above said slurry inlet, said flow control unit having an increasing cross sectional area in the vertical direction and providing a flow passage for the flow of the slurry from said slurry inlet to said slurry outlet, wherein said flow control unit includes a transport fluid bypass unit, said bypass unit including a bypass unit door movable between open and closed positions, said bypass door unit further including a bypass unit screen having a plurality of apertures selected to be smaller than the size of the particles in the slurry and wherein opening said bypass unit door allows transport fluid to flow therethrough to reduce the volume of transport fluid passing through said slurry outlet and therefore enabling the operator to control the flow rate of the slurry through said slurry outlet;

an agglomerate removal unit, said agglomerate removal unit receiving the slurry from said slurry outlet and including an agglomerate removal screen unit through which the slurry is directed for separation of the agglomerates from the slurry;

wherein the slurry enters said flow control unit through said slurry inlet having a first velocity and exits said flow control unit through said slurry outlet having a second velocity, wherein said first velocity is more than said second velocity.

43. The apparatus of claim 42 wherein said second velocity is in the range of about 1 foot per second to about three feet per second.

44. The apparatus of claim 42 wherein said agglomerate removal screen unit comprises at least a first screen, said first screen being angularly disposed relative to the vertical, said first screen having screening apertures dimensioned such that the transport fluid and the particulate matter can flow therethrough and said agglomerates cannot;

wherein the slurry flows from said slurry outlet over said first screen, said first screen separating the agglomerates from the slurry.

45. The apparatus of claim 44 wherein said agglomerate removal screen unit includes a second screen, said second screen being angularly disposed relative to the vertical, said second screen having screening apertures dimensioned such that the transport fluid and the particulate matter can flow therethrough and said agglomerates cannot;

wherein the slurry flows from said slurry outlet over said second screen, said second screen separating the agglomerates from the slurry.

46. The apparatus of claim 42 wherein said flow control unit includes at least one vertically oriented wall disposed between said flow control unit and said agglomerate removal unit, said wall including an opening and wherein said bypass unit door is is hingeably attached to said wall and is movable between said open and closed positions to open and close said wall opening to respectively allow and not allow flow therethrough.

* * * * *